O. JACOBI.
Making White Lead.
No. 77,818.  Patented May 12, 1868.
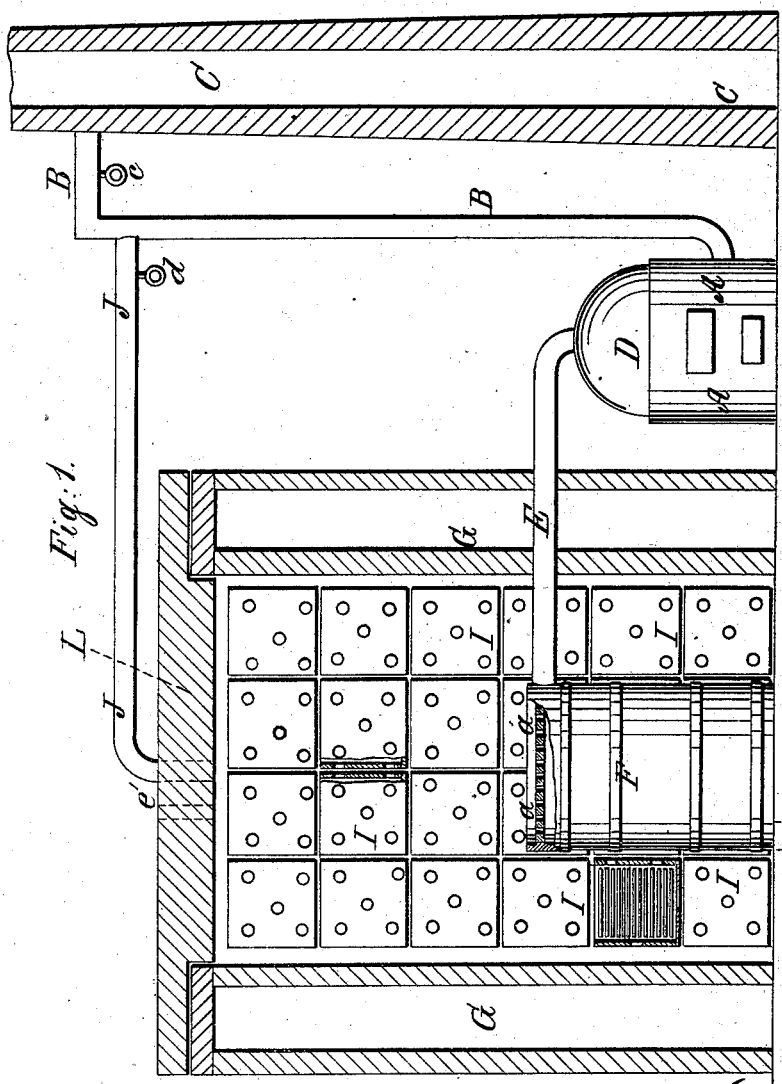

United States Patent Office.

OTTO JACOBI, OF PHILADELPHIA, PENNSYLVANIA.

Letters Patent No. 77,818, dated May 12, 1868.

IMPROVEMENT IN THE MANUFACTURE OF WHITE LEAD.

The Schedule referred to in these Letters Patent and making part of the same.

TO ALL WHOM IT MAY CONCERN:

Be it known that I, OTTO JACOBI, of Philadelphia, in the county of Philadelphia, and State of Pennsylvania, have invented a new and improved Apparatus for Making Carbonate of Lead; and I do hereby declare that the following is a full, clear, and exact description thereof, which will enable others skilled in the art to make and use the same, reference being had to the accompanying drawings, forming part of this specification, in which—

Figure 1 represents a side elevation partly in section of my improved apparatus.

Figure 2 is a detail plan view of one of the boxes in which the lead to be oxidized is placed.

Similar letters of reference indicate corresponding parts.

This invention relates to a new apparatus for converting, by the action of acetic and carbonic acids, lead into carbonate of lead.

The invention consists in combining with a converter, in which the lead is contained, a vinegar-making apparatus and a furnace, all acting in conjunction with each other; the heat of the furnace causing the vapors to arise from a vessel containing vinegar-mash, and to travel to the vinegar-apparatus, whence the acetic acid rises into the chamber or chambers that contain the lead, converting the lead or its outer faces into acetate of lead. Carbonic acid is then conducted into the converter to transform the acetate into carbonate of lead. The lead is held in small wooden boxes, which have perforated sides, so that the gases can freely pass through them.

The apparatus is so constructed that large quantities of lead can at once be converted in it, although it is of very simple construction; and can be cheaply built, while heretofore only very expensive apparatus could be used, whereby the manufacture of white lead was confined to large capitalists, people of small means not being able to erect the costly apparatus.

A, in the drawing, represents a stove or furnace of suitable construction. B is the pipe leading from the furnace to the chimney C, to carry off the products of combustion.

D represents a boiler or vessel of suitable construction, shape, and size. It is to contain vinegar-mash, and is placed upon the furnace, as shown, so that the heat of the furnace may cause the vapors to rise in the boiler, whence they are conducted through a pipe, E, into a vessel, F. This vessel F is filled with shavings or other material which will cause the vapors from the mash to acidify. The acetic vapors thus produced rise through the perforated cover $a$ of the vessel F into the converter G, in which the vessel F stands, as is clearly shown in fig. 1.

The converter is a structure built up of wood, or other suitable material, wood being preferable. The wooden walls should be double, as shown, and the spaces between them should be filled with some non-heat-conducting substance. In the converter is set up a series of small wooden boxes, I I, which contain the lead.

Each of these boxes has perforated sides, as shown, and is open on top. The lead to be acted upon is cast in form of slotted plates, as in fig. 2, and is placed into the boxes in layers, as shown by section in fig. 1, and the boxes I are set around the vessel F, and above the same, so as to partly fill the converter. They are placed one upon the other, and side by side, so that the gases can circulate through all the boxes, by passing from one to the other through the holes in their sides. The acetic vapors rising from the vessel F, and circulating around the lead, convert the surfaces of the lead into acetate of lead.

J represents a pipe extending from the pipe B to the converter. The pipes B and J are provided with dampers $c$ and $d$ respectively. As long as the products of combustion are impure, the damper $d$ remains closed, but when they are comparatively pure, the damper $d$ is opened and $c$ closed, so that the carbonic acid can enter the converter to transform the acetate of lead into carbonate of lead, which is the article required.

K is an overflow-pipe, carrying away from the vessel F the superfluous vinegar. This pipe extends from the bottom or from the side of the vessel F to the outside of the converter.

By means of a number of pipes, E and J, the furnace can be connected with a series of converters at once.

Through a hole, $e$, in the removable cover L of the converter, the gases can escape from the converter.

Having thus described my invention, what I claim as new, and desire to secure by Letters Patent, is—

1. An apparatus for producing carbonate of lead, consisting of the furnace A, boiler D, converter G, and of the perforated boxes I I, or their equivalents, all made and operating substantially as herein shown and described.

2. The device set forth in the foregoing clause, in combination with the vinegar-apparatus F arranged within the converter, as described.

3. The pipes B and J, in combination with the converter G, all made and operating as described, the pipes being provided with dampers $c$ and $d$ respectively, as specified.

OTTO JACOBI.

Witnesses:
    WM. F. McNAMARA,
    ALEX. F. ROBERTS.